Patented Dec. 4, 1951

2,577,706

UNITED STATES PATENT OFFICE 2,577,706

HIGH MELTING-HIGH WATER-RESISTANT GREASE

Bruce W. Hotten, Richmond, Calif., assignor to California Research Corporation, San Francisco, Calif., a corporation of Delaware No Drawing. Application November 26, 1948, Serial No. 62,230

19 Claims. (Cl. 252—42)

This invention relates to an improved grease having the combined characteristics of high water resistance and high melting point. More particularly, this invention relates to a high melting point grease to which has been added a selected agent for the purpose of improving the resistance of the grease to emulsibility in water.

In the art of lubrication, it has been apparent that the proper lubrication of the several parts of motors, e. g., bearings, gears, etc., could not be accomplished by the use of only one type of lubricant. It has become increasingly important to prepare lubricants which are specific to a particular job. For example, high melting point lubricants (e. g., a high dropping point grease), are used for lubricating automotive wheel bearings, steel mill equipment, high speed motors, universal joints, rocker arms of airplane motors, etc.; while highly water-resistant lubricants (e. g., a grease characterized by low solubility and low emulsibility in water) are used for lubricating water pumps, automotive chassis, valves, etc.

It is known that the soda soap greases have good high temperature characteristics, but very poor resistance to water. It is also known that the lime soap greases have good resistance to water, but very low softening temperatures. Blending together a soda grease and a lime grease does not satisfactorily obtain the high melting point effect of a soda-base grease and the high water-resistant effect of a lime base grease. The ratio of lime soap to soda soap required to obtain water-resistance is so high that the melting point of the mixed grease is greatly reduced.

Industry has long been faced with the problem of obtaining an adequate grease having both a high melting point and high water resistance, but no solution satisfactory in all respects has heretofore been available. Although greases containing certain salts, e. g., lithium, of selected fats and organic acids have shown some improvement, such products are usually too expensive for many uses.

It is, therefore, an object of this invention to prepare lubricants which have high melting points and high resistance to water emulsibility, and which also are inexpensive.

It is a further object of this invention to provide a lubricant composition combining the advantages of and satisfying the requirements of a high melting point type lubricant and a high water-resistant type lubricant.

It is another object of this invention to prepare a grease composition having improved adherence to metal surfaces.

A further object of this invention is to improve the water resistance of high melting point greases of the soda-base type.

A general object of this invention is to provide an improved grease composition.

These and other objects of this invention will be apparent from the following description and the appended claims.

Briefly, the improved grease composition of the present invention comprises a lubricating oil, a thickening agent, such as an organic acid metal salt in sufficient amount to thicken the oil to a stable grease, and a partially saponified polymeric compound.

In accordance with this invention, it has been found that a high melting point, highly water-resistant grease may be obtained by incorporating in a lubricating oil a thickening agent, e. g., a metal salt of an organic acid, and a polymeric compound containing recurring saponifiable polar groups, some of which are saponified. The partially saponified polymeric compounds unexpectedly impart high water resistance to grease compositions otherwise having low water resistance and further effects such highly desirable improvement without adversely affecting the melting point or temperature resistance of the grease.

By "saponified polymeric compound" is meant the product, which may be obtained by the reaction of a polymer containing a plurality of saponifiable groups and a metal oxide or hydroxide, for example, where the recurring saponifiable group is a carboxyl group (either as free acid or carboxy ester), the reaction product contains both unreacted carboxy groups and metallo-carboxy groups.

The improved high melting point grease resulting from the incorporation of such a partially saponified polymeric compound in a grease in accordance with the present invention may be used at temperatures at which commonly available water-resistant greases normally would flow from the part to be lubricated, and also be used under conditions at which water normally would wash away commonly available high melting point greases. Thus, the present invention provides a grease which combines the high temperature characteristics of a soda-base grease and the high water resistance properties of a lime-base grease. Such a grease has a wide variety of applications, particularly where both water and high temperatures are encountered, such as in steel mill rollers and transfer table bearings, paper mill roll bearings, automotive wheel bearings under winter and flood conditions, including use in amphibious military vehicles, high temperature cannery equipment, exposed control surface bearings for aircraft, etc.

The grease stocks which are improved in accordance with this invention by incorporation therein of the partially saponified polymeric compound include fibrous as well as unctuous type greases. It is preferred that the high melting point grease having a partially saponified polymeric compound incorporated therein be a soda-base grease; that is, a grease containing a sodium soap as the thickening agent. The soda-base grease is preferred because of its exceptionally high melting point, and when a partially saponified polymeric compound is added thereto in sufficient amount, the resultant grease has not only the desirable high temperature qualities of a typical soda grease, but also substantial resistance even to boiling water.

Furthermore, as compared to presently used greases, a soda base grease containing a partially saponified polymeric compound in accordance with the present invention has other specific advantages, including finer texture, lack of adverse effects on oxygen resistance, etc.

The present grease compositions containing partially saponified polymeric compounds have a greater tendency to adhere to metal surfaces than the grease compositions containing no partially saponified polymeric compound. This characteristic permits the grease compositions to cling to the surfaces which are to be lubricated, providing a greater degree of lubrication than heretofore.

Also, the partially saponified polymeric compound often reduces the amount of "bleeding" in certain grease compositions, i. e., reduces the amount of oil separating from the grease.

The grease composition of the present invention consists essentially of a lubricating oil, a thickening agent, and a partially saponified polymeric compound, although other ingredients may be included, such as dyes, other grease-modifiers, fillers, inhibitors, etc.

Suitable lubricating oils include a wide variety of oils, such as naphthenic base, paraffin base and mixed base mineral oils, synthetic oils, e. g., alkylene oxide polymers such as polypropylene oxide polymers, and other hydrocarbon lubricants, e. g., lubricating oil derived from coal products. The lubricating oil is the major portion of the grease composition of this invention.

Any suitable thickening agent which is satisfactory in itself to form a grease may be used. Most commonly employed for this purpose are organic acid metal salts, which may be represented by the formula:

$$\left[RX\right]_n^- M^+$$

wherein R represents a saturated or unsaturated alkyl group or an aralkyl group, the R group having from 10 to 30 carbon atoms, 16 to 22 carbon atoms being preferred; X represents a carboxy group, (i. e., a

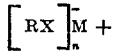

group), a phosphonyl group (i. e., a

group), a sulfonyl group (i. e., a

group), or a sulfate group (i. e., a

group); and M represents a metal of groups I and II of the periodic table. Specifically, M may be sodium, potassium, lithium, calcium, barium, or strontium. However, it is preferred that M be of group I of the periodic table, sodium and potassium being preferred. $n$ represents an integer having a value of 1 or 2, depending on whether M is monovalent or divalent. When M is monovalent, $n$ has a value of one; when M is divalent, $n$ has a value of two.

The hydrogens of the R group may be substituted by polar groups such as chlorine, bromine, alkoxy, hydroxy, mercapto, etc.

Examples of the organic acids which may be used in the formation of the metal salts include lauric acid, myristic acid, palmitic acid, stearic acid, oleic acid, arachidic acid, melissic acid, phenylacetic acid, cetylbenzoic acid, acids resulting from the oxidation of petroleum products (e. g., waxes), cetanesulfonic acid, dodecylbenzenesulfonic acid, dodecanephosphonic acid and lauryl sulfuric acid. Acids of lower molecular weight, such as acetic acid and the like, may be admixed with the acids forming the thickening agents upon conversion to the metal salt, which lower molecular weight acids often beneficially modify the characteristics of the grease compositions.

The organic acid metal salt thickening agent is incorporated in the composition of this invention in amounts sufficient to form the grease. Such amounts as about 5% to about 50% (based on the finished composition) may be used. However, about 10% to about 30% are the preferred amounts.

As stated above, the improving agent of this invention is a partially saponified polymeric compound, which results from reacting a high molecular weight polymer containing recurring saponifiable groups with a metal oxide or a metal hydroxide to saponify part of said saponifiable groups. When the recurring saponifiable group is a carboxyl group, the resultant product contains metallo-carboxy groups, such as

and/or

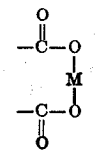

wherein M is a metal. Thus, the present agent may be generally defined as a high molecular weight polymeric compound containing a plurality of recurring saponifiable groups, e. g., free carboxyl, carboxy-ester, cyano, and like radicals, and also containing a plurality of recurring metal-containing groups, e. g., metallo-carboxy, metallo-oxy, and like radicals. Likewise, the sulfur and selenium analogues of such saponifiable groups may be employed.

Although it is preferred to use polymer compounds having a molecular weight range of 10,000 to 20,000, it is feasible to use polymeric compounds having molecular weights from 2,000 or less to 50,000 and above.

The metal cation used in the saponification of the polymeric compound ordinarily will be the metals of groups I and II of the periodic table; specifically, sodium, potassium, lithium, calcium, barium and strontium. It is usually preferred to use sodium and potassium.

It is intended that the polymeric compounds of this invention should only be partially saponified; that is, it is intended that less than the equivalent amounts of metal oxide or hydroxide are used in the reaction than is necessary for complete reaction with all of the saponifiable groups of the polymer, so that not all of the carboxy-ester or carboxy groups of Formulae a, b and c, noted hereinbelow, or all of the nitrile groups of Formula b should be saponified. About 10% to about 60% of the totally available saponifiable groups of the polymeric compound may be saponified. For optimum compatibility and improvement, it is preferred that about 20% to about 40% of the totally available saponifiable groups of the polymeric compound be saponified. The degree of saponification may be followed by measuring the free alkalinity at intervals. When the carboxyester, carboxy and nitrile groups are completely saponified, the polymeric compound normally becomes too water-soluble for the purposes of this invention. On the other hand, too little saponification imparts too much oil-solubility to the polymeric compound, the grease becoming too fluid.

Suitable monomer units for forming the polymeric compound are acrylates, such as esters of acrylic acid, methacrylic acid and higher homologues, represented by the formula:

(a)
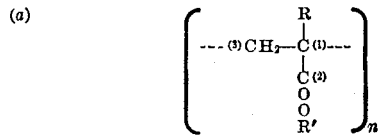

wherein the R and R' may be a hydrogen, an alkyl group, an aralkyl group, an alkaryl group and/or an aryl group; n represents the number of molecular units present.

The dotted lines of the above Formula a represent the positions at which the remaining units of the polymeric compound are attached.

Representative monomers for the polymeric compounds of Formula a are amyl acrylate, octyl acrylate, dodecyl acrylate, hexadecyl acrylate, octadecyl acrylate, amyl methacrylate, octyl methacrylate, dodecyl methacrylate, hexadecyl methacrylate, and octadecyl methacrylate.

In addition to the polymer formed from the compound of the above monomer unit formula, a copolymer may be formed by reacting the monomer unit of Formula b:

b)

with olefinic compounds; for example, styrene ($C_6H_5CH=CH_2$), butadiene

vinyl chloride ($CH_2=CHCl$), vinylidene chloride ($CH_2=CCl_2$), tetrafluoro-ethylene ($CF_2=CF_2$), chlorotrifluoroethylene

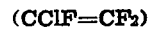

ethylene ($CH_2=CH_2$), chlorinated styrene, β-pinene, indene, isobutylene, isoprene, acrylonitrile, vinyl acetate, chloroprene, maleic anhydride, or other materials known to the art which may be reacted with the above molecular unit formula to form a polymeric substance. The R group of the above Formula b may be hydrogen, a saturated or an unsaturated alkyl group, an aralkyl group, an alkaralyl group or an aryl group. X may be a nitrile group (—CN), a carboxy group (—COOH), or a carboxy-ester group (—COOR'). The R' of the carboxy-ester group may be a saturated or an unsaturated alkyl group, an aralkyl group, an alkaryl group or an aryl group. The hydrogens of the R and R' groups may be substituted with polar groups such as chlorine, bromine, alkoxy, hydroxy, mercapto, etc.

Within the scope of this invention, it is intended to include derivatives of the monomer exemplified by the above Formulae a and b. That is, a carbon chain may be present between carbons (1) and (2) of Formula a and carbon (1) and X of Formula b to form monomer units exemplified by the following Formulae c and d:

(c)
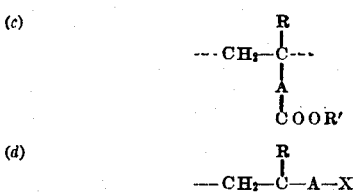

(d)

wherein A represents a methylene group (—$CH_2$—), an ethylene group (—$CH_2$—$CH_2$—), and higher homologues. Furthermore, one of the hydrogen atoms of the number (3) carbon atom of the above Formula a may be replaced by a methyl group to form a methyl crotonic acid polymer as exemplified in Formula e:

(e)
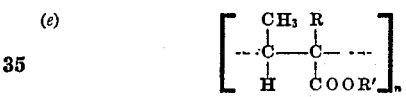

wherein R and R' represent the same groups as in Formula a and n represents the number of monomeric units present. The polymer represented by Formula e may be obtained, for example, by polymerization of amyl ester of α-methyl crotonic acid, dodecyl ester of α-methyl crotonic acid, octadecyl ester of α-methyl crotonic acid, etc.

The partially saponified polymeric compound may also be derived from a polymeric compound having a monomer unit containing a carboxy group, which monomer has the formula:

(f)
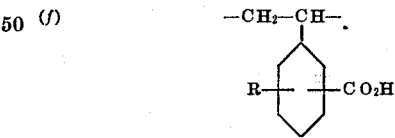

Such vinyl benzoic acid derivative polymers may be partially saponified and used within the meaning of a partially saponified polymeric substance of this invention.

The polymeric compound may also be (1) a cellulose derivative; i. e., a carboxy methyl cellulose esterified with an alcohol such as lauryl alcohol, and then partially saponified; or (2) a polymeric compound such as represented by the following formula for polypentaerythrityl polyglyceryl soyate pyromellitate:

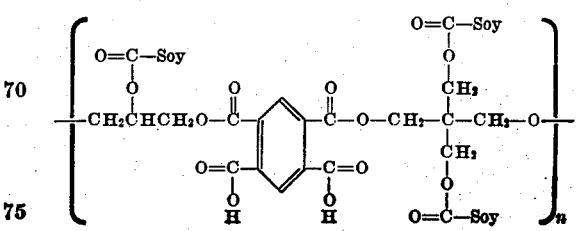

wherein $n$ represents the number of monomeric units present, and Soy a soya bean oil fatty acid radical.

In forming the partially saponified polymeric compounds, part of the saponifiable monomer may be saponified first and thereafter copolymerizing the resultant saponified monomer with unsaponified monomer, or, as preferred, an unsaponified monomer may be first polymerized and the resultant polymer then partially saponified.

As noted hereinabove, the presence of the partially saponified polymeric compound in the high melting point grease reduces the possibility of emulsibility of the grease with water (that is, increases the resistance of the grease to the harmful effects of water); without at the same time deleteriously affecting its high melting point characteristics. Several factors noted hereinbelow govern the use of partially saponified polymer compounds for this purpose in greases.

The amounts of partially saponified polymeric compound which are effective for the purposes of this invention may vary, depending upon the partially saponified compound which is selected and the consistency and the melting point desired in the final composition. The partially saponified polymeric compound may be incorporated in the lubricant composition in amounts of about 0.05% to 7.5% or more by weight, based on the final composition, preferably 0.5% to 3%. The use of too large an amount of the partially saponified polymeric compound in the composition of this invention, for example, results in the formation of a grease having a rubber-like consistency. On the other hand, the use of too small an amount of the partially saponified polymeric compound results in a grease that lacks in maximum water-resistant properties.

In order to obtain the maximum effects from a partially saponified polymeric compound for reducing the tendency of a grease to emulsify with water, the number of carbon atoms in the R and R' groups of the above polymer representative formulae and the types of R and R' groups present are of importance. For example, in Formula $a$ where R is hydrogen or a methyl group and R' is a low molecular weight aryl or alkyl group, the resulting partially saponified polymeric compound will be less oil soluble and exhibit less effect in resisting water emulsibility than will a polymeric compound in which the R' is a long-chained alkyl group. This does not mean that the greater the oil solubility of the polymeric compound the greater its effect in the grease. As noted hereinabove, the compounded grease can become too fluid if the polymeric compound is too oil soluble. The total number of carbon atoms in the R and R' groups may be from 5 to 40 carbon atoms. It is preferred that the R group be an alkyl group containing not more than three carbon atoms, and that the R' group be an alkyl group containing from about 8 carbon atoms to about 16 carbon atoms.

It is preferred that the oil solubility of the partially saponified polymeric compound be such that the combined effects of the polymeric compound, the metal salt of the fatty acid and the lubricating oil will impart the desired consistency in the finished grease composition. Thus, at least partial control of the consistency of the finished grease composition can be obtained by varying the nature of the partially saponified polymeric compound within the scope of the present invention. Such control is obtained by varying the proportion of metal-containing saponified groups, or the length of carbon chain in respect to each saponifiable group, or both. Generally, the saponifiable polymeric material is partially saponified to such an extent that the product contains a range of percentage by weight of metal atoms, the range depending upon the atomic weight of the specific metal concerned. For example, in the case of potassium, this range is from about 5% to about 20%, and for lithium it is about 1% to about 4%.

The effect of the partially saponified polymeric compound is also influenced by the selection of the metal in the metal containing saponified groups. Usually, the monovalent metal cation in the saponified polymeric compound has a greater effect for the purposes of this invention than does the polyvalent metal cation in the same polymeric compound. Better compatibility of the partially saponified polymer and the other grease components has been obtained when both the partially saponified polymer and the thickening agent, e. g., soap, contain metal ions from the same groups of the periodic table, e. g., the alkali metals.

In blending the polymeric compound into the grease composition, consideration must be made of the weight ratio of the salt of the organic acid present to the saponified polymeric compound. Although generally the ratio is such that the organic acid salt is present in greater amounts by weight than the polymeric compound, the maximum water resistance of the grease is lost when the ratio of the organic acid salt to the polymeric compound is too high. On the other hand, when the ratio is too low, the grease becomes rubber-like. It is preferred that the ratio be from about 5 to 30 parts by weight of the organic acid salt to 1 part by weight of the polymeric compound. Consistent with these considerations, a small amount, sufficient to impart increased water resistance to the grease, of the partially saponified polymeric compound is ordinarily employed.

In the compounding of the grease, a metal salt of an organic acid and a partially saponified polymeric substance may be incorporated together with the oil in any manner and by any method desired. For example, a fatty acid suitable for forming the thickening agent may be added to the oil component, and saponified by reaction with added saponifying agent, e. g., aqueous caustic, followed by heating to remove introduced water and water resulting from the reaction. Thereafter, a mineral oil concentrate of the partially saponified polymeric compound may be incorporated into the mixture to form the finished grease. However, if desired, the unsaponified polymeric compound may be saponified at the same time as the fats, fatty acids, etc. That is, an admixture of the oil component, together with a suitable unsaponified polymeric compound and a fatty material capable of forming the thickening agent, may be treated with an alkaline substance in sufficient quantity to saponify the fatty material and the desired portion of the totally available saponifiable groups in the polymeric compound.

As noted above, the present agent is conveniently handled as a concentrate and thus the saponification of the saponifiable polymeric compound is preferably carried out in the presence of from about 200% to about 700% (based on the total amount of polymeric compound) of mineral oil, usually of the same type and viscosity as in the grease into which the partially saponified polymeric material is to be incorporated. For example, such concentrates may be prepared by heating the unsaponified polymeric compound in oil with a solution or a slurry of oxide or the hydroxide of the metals of groups I and II of the periodic table to a temperature of about 400° F. until the free base has been substantially all reacted. The resulting concentrate may be stored and added in the desired percentages to various greases to increase the water resistance.

Although the polymeric compounds may be saponified at atmospheric pressure and high temperatures (e. g., 400° F.), a smoother, more satisfactory product is obtained when the saponification is performed under pressure at a lower temperature such as about 300° F. For example, the oil component, polymeric compound, and saponifying agent may be introduced into a closed vessel and the pressure allowed to build up on heating.

The folowing examples will serve further to illustrate the preparation of the greases of the invention. (Properties of the resultant compositions are given in tables folowing.)

*Example I.—Partial potassium salt of polyoctyl methacrylate*

10 grams of a polyoctyl methacrylate (molecular weight about 10,000) in a 55% solution in petroleum oil, 0.5 gram of C. P. potassium hydroxide and 10 grams of a mineral oil having a viscosity of 464 SSU at 100° F. and 51 SSU at 210° F. mixed together and heated at 400° F. for one hour and thereafter cooled to room temperature. The resulting potassium polyoctyl methacrylate concentrate was then thoroughly milled into a mineral oil grease containing 14% of sodium stearate (from stearic acid of commerce containing 40% to 60% of stearic acid and the remainder palmitric acid). The final grease composition contained 10% of the partially saponified polymer concentrate.

*Example II.—Partial potassium salt of copolymer of "cetyl" methacrylate*

A mixture of 250 grams of C. P. potassium hydroxide and 5,000 grams of a 40% light petroleum oil solution of a "cetyl" methacrylate polymer (from a mixture of octyl, decyl, lauryl, myristyl, cetyl and stearyl alcohols, the cetyl alcohol predominating), which polymer had a molecular weight of about 20,000, was admixed with 4,750 grams of a mineral lubricating oil having a viscosity of 464 SSU at 100° F. and 51 SSU at 210° F. The resultant admixture was heated for 4 hours at about 325° F. under a gauge pressure of 20 pounds per square inch. The product was a potassium polymer salt concentrate and was blended with a grease containing 14% sodium stearate (derived from stearic acid of commerce) and the remainder the same mineral lubricating oil as above, to yield a final composition containing 10% of the partially saponified polymer concentrate.

*Example III.—Partial lithium salt of polylauryl methacrylate*

A mixture of 0.4 gram of lithium hydroxide, 20 grams of a 40% light petroleum oil solution of polylauryl methacrylate (prepared from commercial lauryl alcohol containing minor amounts of $C_{10}$ to $C_{14}$ alcohols; the polymer containing minor proportions of octadecyl methacrylate polymer) having a molecular weight of about 20,000, and 34.2 grams of the mineral lubricating oil of Example I were heated at about 400° F. for 45 minutes and thereafter cooled to room temperature. The concentrate of the partial lithium salt of polylauryl methacrylate was then thoroughly milled into a portion of the same soda-base grease as in Example I, so that the final grease composition contained 18% of the partially saponified polymer concentrate.

*Example IV.—Partial potassium salt of polylauryl methacrylate*

A mixture of 0.9 gram of potassium hydroxide, 36 grams of a 40% light petroleum oil solution of polylauryl methacrylate (prepared from commercial lauryl alcohol containing minor amounts of $C_{10}$ to $C_{14}$ alcohols; the polymer containing minor proportions of octadecyl methacrylate polymer), having a molecular weight of about 20.000, and 36 grams of the mineral lubricating oil of Example I were heated at 400° F. for 3 hours, and thereafter cooled. The resultant potassium lauryl methacrylate polymer concentrate was blended with a soda-base grease containing 18% sodium stearate and 82% of the mineral lubricating oil of Example I so that the final grease composition contained 10% of the partially saponified polymer concentrate.

*Example V.—Partial calcium salt of copolymers of "cetyl" methacrylate*

A mixture of 4 grams of calcium hydroxide and 40 grams of a 40% light petroleum oil solution of the "cetyl" methacrylate polymer of Example II was heated at 400° F. for about 6.25 hours. The resulting partially saponified polymer was added to a mineral oil grease containing 14% sodium stearate prepared from stearic acid of commerce, so that the final grease composition contained 14% of the partially saponified polymer concentrate.

*Example VI.—Partial barium salt of copolymer of "cetyl" methacrylate*

A mixture of 100 grams of the 40% solution of "cetyl" methacrylate copolymer of Example II, 20 grams of barium hydroxide octahydrate, and 125 grams of the mineral oil of above Example I was heated at 400° F. until the free base was substantially all neutralized. This concentrate was blended with a mineral oil grease containing 12% sodium stearate (prepared from stearic acid of commerce) so that the final grease composition contained 21% of the partially saponified polymer concentrate.

*Example VII.—Partial sodium salts of copolymer of "cetyl" methacrylate*

A mixture of 12 grams of the 40% solution of "cetyl" methacrylate copolymer of Example II, 0.6 gram of C. P. sodium hydroxide, and 20 cc. of the mineral oil of Example I was heated at 400° F. for about 1 hour. The mixture was then cooled to room temperature, and thereafter thoroughly milled into a grease containing 14% sodium stearate (derived from stearic acid of commerce) and the remainder mineral lubricating oil, so that the final grease composition contained about 10% of the partially saponified polymeric substance.

Example VIII.—Sodium sulfonate-partial potassium salt grease

A grease was prepared by blending the indicated proportions of the following components together at 400° F.:

| | Per cent by weight [1] |
|---|---|
| Potassium "cetyl" methacrylate polymer salt concentrate of above Example II | 10 |
| Sodium dodecyl benzene sulfonate | 25 |
| The mineral lubricating oil of Example I | 65 |

[1] Based on final composition.

Example IX.—Partial sodium salt of copolymer of "cetyl" methacrylate

A mixture of 5 grams of sodium hydroxide and 100 grams of the 40% solution of methacrylate copolymer of Example II was heated at 400° F. for about 1 hour. The product was then added to 500 grams of a mineral oil having a viscosity of 464 SSU at 100° F. and 51 SSU at 210° F. at about 300° F. to form a grease. The resulting grease was found to be highly resistant toward emulsification in cold or hot water.

Example X.—Preparation of polypentaerythrityl polyglyceryl soyate pyromellitate A mixture of 0.05 mol of soya bean oil (consisting of 53% linoleic acid, 25% oleic acid, and minor amounts of stearic and palmitic acids, and having a molecular weight of 885), 0.05 mol of pentaerythritol and 0.1% sodium hydroxide was heated at 230° C. until a one-phase system was produced. The resulting solution was then heated for an additional hour at 230° C. This whole product was cooled and mixed with 0.1 mol of pyromellitic anhydride. This mixture was then heated up to 100° C. and cooled to room temperature. The product was a polypentaerythrityl polyglyceryl soyate pyromellitate.

Example XI.—Partial lithium salt of polypentaerythrityl polyglyceryl soyate pyromellitate A mixture of 3.5 grams of lithium hydroxide monohydrate and a solution of 20 grams of polypentaerythrityl polyglyceryl soyate pyromellitate in 90 grams of the mineral oil of Example I was heated at about 400° F. until the free carboxyl groups were substantially all neutralized, leaving the carboxy ester groups unsaponified. After cooling the mixture, 14 grams of sodium stearate (prepared from commercial stearic acid) was added. The resulting grease composition contained the lithium salt of polypentaerythrityl polyglyceryl soyate pyromellitate and sodium stearate.

Example XII.—Soda base grease

A soda-base grease substantially the same as the sodium stearate grease base used in previous examples was prepared by mixing 2.7 grams of sodium stearate prepared from commercial stearic acid and 15 grams of the mineral lubricating oil of Example I, and heating the admixture at 315° F. for about 1 hour at a pressure of about 65 pounds per square inch gauge. The resultant grease was then cooled to room temperature.

Example XIII.—Soda base grease containing potassium "cetyl" methacrylate polymer To the grease of Example XII was added six grams of the potassium "cetyl" methacrylate polymer concentrate of Example II and 62 grams of the mineral lubricating oil of Example I. With continual stirring, the resulting admixture was slowly heated from room temperature up to about 460° F. and then maintained at that temperature, the total period of heating with stirring being 2 hours; thereafter, the finished grease was placed in pans to cool.

Example XIV

A soda-base grease was prepared in the same manner as in Example XII, except that tallow was substituted for stearic acid.

Several of the grease compositions of the above examples were subjected to a rigorous water resistance test by making a ball of grease of 5±0.2 grams weight, then immersing the ball in boiling distilled water for one hour. The observed weights of the balls at the end of the one hour test period are given in the following Table I:

TABLE I

| Test No. | Grease Preparation | Grease Thickening Agent | Agent Added | Weight of Ball at End of Test |
|---|---|---|---|---|
| | | | | Grams |
| 1 | As in Example II above | Sodium stearate | Potassium "cetyl" methacrylate polymer | 4.5 |
| 2 | As in Example III above | do | Lithium polylauryl methacrylate | 2.5 |
| 3 | As in Example V above | do | Calcium "cetyl" methacrylate polymer | 1.0 |
| 4 | As in Example VI above | do | Barium "cetyl" methacrylate polymer | 2.0 |
| 5 | As in Example VII above | do | Sodium "cetyl" methacrylate | 4.5 |
| 6 | As in Example VIII above | Sodium alkaryl sulfonate | Potassium "cetyl" methacrylate polmer | 4.0 |
| 7 | As in Example XI above | Sodium stearate | Lithium polypentaerythrityl polyglyceryl soyate pyromellitate | 4.5 |
| 8 | As in Example XII above | do | None | [1] 0.0 |

[1] Completely disintegrated at the end of 8 minutes.

It will be noted from Table I above that in every case where the agent of the present invention is incorporated into the grease, at least a considerable improvement is obtained.

In another series of tests, grease compositions with and without incorporation of partially saponified polymeric compound were subjected to Army-Navy Aeronautical Specification Water Resistance Test (AN–G–5a; October 4, 1944). The test consists of packing a ball bearing with 4.0 grams of the grease to be tested. The ball bearing is clamped in a tightly fitted housing so that the outer race is stationary and the inner race is allowed to turn freely. The inner race is mounted on a horizontal shaft so that the inner race revolves with the shaft at the rate of 600 revolutions per minute. A fine stream of water (distilled) circulating at the rate of 5 cc. per second, is directed at the outer race of the bearing from a one millimeter capillary so that the water impinges on the bearing housing and flows over the ball bearing. This test is run for one hour. The bearing is then removed, dried at 180° F. and reweighed to determine the grease loss. Table II below shows the percentage weight loss when employing the grease compositions made in accordance with the above examples. Table II indicates the source of the grease stock. The listed amounts of the partially saponified polymer concentrates of the indicated examples were incorporated into the grease stock in accordance with the procedure given in Example XIII.

TABLE II

*Water resistance as shown by AN-G-5a test*

| Test No. | Grease Stock Preparation | Agent Added | Wt. Per Cent of Agent Added | Per Cent Loss |
|---|---|---|---|---|
| 9 | As in Example XII above | None | | 9.8 |
| 10 | As in Example XII above | Potassium "cetyl" methacrylate concentrate of Example II | 3 | 0.0 |
| 11 | As in Example XIV above | None | | 7.3 |
| 12 | As in Example XIV above | Potassium "cetyl" methacrylate concentrate of Example II | 6 | 2.6 |
| 13 | As in Example XIV above | Potassium "cetyl" methacrylate concentrate of Example II | 10 | 0.0 |

It is to be understood that the grease compositions of the present invention may contain, in addition to the lubricating oil, thickening agent, and partially saponified polymeric compound, other lubricant additives, such as extreme pressure agents, anti-oxidants, corrosion inhibitors, etc.

As used in the claims, "consisting essentially of" means that the composition is made up almost entirely of the ingredients recited, that these ingredients are the main and characterizing ones. However, this expression does not exclude the presence of minor amounts of other ingredients which are commonly employed in lubricating compositions or which are merely inert.

I claim:

1. An improved lubricant comprising a major proportion of a grease stock consisting essentially of a lubricating oil and an organic acid alkali metal salt grease thickening agent, and a small amount, sufficient to improve the resistance of said grease stock to emulsification in water, of a polymeric compound containing recurring saponifiable groups selected from the class consisting of carboxyl and carboxy-ester groups, of which from 10% to 60% are saponified by metals selected from the group consisting of alkali metals and alkaline earth metals.

2. A grease composition consisting essentially of a major portion of lubricating oil, an organic acid alkali metal salt grease thickening agent in an amount sufficient to thicken said oil to form a grease, and a small amount, sufficient to increase the resistance of the grease composition to emulsification in water, of a polymeric compound containing recurring saponifiable groups selected from the class consisting of carboxyl and carboxy-ester groups, of which from 10% to 60% are saponified by metals selected from the group consisting of alkali metals and alkaline earth metals.

3. The composition of claim 2, wherein said thickening agent is a metal salt of a carboxylic acid having about 10 to 30 carbon atoms.

4. The composition of claim 2, wherein the metal in said alkali metal is sodium.

5. The composition of claim 2, wherein said thickening agent is an alkali metal salt of a sulfonic acid.

6. The composition of claim 2, wherein the polymeric compound is obtained from monomers of the group consisting of acrylic acid, esters of acrylic acid, methacrylic acid and esters of methacrylic acid; each ester group of said acrylic acid and the methacrylic acid containing from 5 to 40 carbons; and wherein from 10 to 60% of the saponifiable groups of the polymeric compound are saponified by a metal selected from the group consisting of alkali metals and alkaline earth metals.

7. The composition of claim 2, wherein the polymeric compound is a copolymer formed by the reaction of a material of the group consisting of acrylic acid, methacrylic acid, esters of acrylic acid and esters of methacrylic acid, said ester groups each containing from 5 to 40 carbon atoms, with an olefin of the group consisting of styrene, butadiene, vinyl chloride, tetrafluoroethylene, chlorotrifluoroethylene and ethylene, and where from 10% to 60% of the saponifiable groups of the polymeric compound are saponified by a metal selected from the group consisting of alkali metals and alkaline earth metals.

8. The composition of claim 1, wherein the polymeric compound is a copolymer of a compound of unit formula

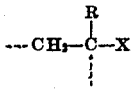

wherein R is a member of the group consisting of hydrogen and methyl groups; X is a member of the group consisting of carboxy (COOH), carboxy-ester (—COOR', wherein R' is a hydrocarbon group containing 5 to 40 carbon atoms), and nitrile (—CN) groups; with a member of the group consisting of styrene, butadiene, vinyl chloride, tetrafluoroethylene, chlorotrifluoroethylene and ethylene.

9. An improved grease composition consisting essentially of a major proportion of a lubricating oil, an organic acid alkali metal salt grease thickening agent in sufficient amount to thicken said oil to grease consistency, and a small amount, sufficient to improve the resistance of the grease to emulsification in water, of a polymeric compound containing a plurality of recurring metallo-carboxy groups and a plurality of recurring groups selected from the class consisting of free carboxyl and carboxy-ester groups, said metallo-carboxy groups comprising from 10% to 60% of the saponifiable groups present in the polymeric compound, and said metal of the metallo-carboxy groups being selected from the group consisting of alkali metals and alkaline earth metals.

10. A grease composition comprising a major proportion of a lubricating oil, about 0.2% to about 7.5% by weight based on finished composition of a polymeric compound containing recurring saponifiable groups selected from the class consisting of carboxyl and carboxy-ester groups, of which saponifiable groups from 10% to 60% are saponified by metals selected from the group consisting of alkali metals and alkaline earth metals and about 10% to 30% by weight of the finished composition of an alkali metal salt of an organic acid containing about 10 to 30 carbon atoms.

11. A grease composition consisting essentially of a major proportion of a lubricating oil, an organic acid alkali metal salt grease-thickening agent in sufficient amount to thicken said oil to a grease, and a small amount of a partially saponified polymeric compound containing recurring saponifiable groups selected from the class consisting of carboxyl and carboxy-ester groups, of which group from 10% to 60% is saponified by a metal selected from the group consisting of alkali metals and alkaline earth metals; there being from 2 to 60 parts by weight of said thickening agent present for each part by weight of said partially saponified polymeric compound.

12. The composition of claim 11, wherein the polymeric compound having recurring saponifiable groups is obtained from monomers of the group consisting of acrylic acid, esters of acrylic acid, methacrylic acid and esters of methacrylic acid, wherein said ester groups contain from 5 to 40 carbon atoms, and wherein the saponifiable groups are saponified to the extent that the polymeric compound has a metal content of from 5% to 20% by weight.

13. An improved grease composition consisting essentially of a major proportion of a lubricating oil, an organic acid sodium salt grease thickening agent in an amount sufficient to thicken said oil to grease consistency, and a small amount, sufficient to improve the resistance of the grease to emulsification in water, of a polymeric compound containing recurring saponifiable groups selected from the class consisting of carboxyl and carboxy-ester groups, of which about 10% to 60% are saponified with an alkali metal.

14. The composition of claim 13, wherein said alkali metal is potassium.

15. The composition of claim 13, wherein said alkali metal is sodium.

16. A grease composition consisting essentially of a major proportion of a lubricating oil, an organic acid alkali metal salt grease thickening agent in sufficient amount to thicken said oil to grease consistency, and a small amount sufficient to increase the resistance of the grease composition to emulsification in water, of a polymeric compound containing recurring saponifiable groups selected from the class consisting of carboxyl and carboxy-ester groups, of which 10% to 60% are saponified by a metal selected from the group consisting of alkali metals and alkaline earth metals, there being from 7 to 30 parts by weight of the alkali metal salt of organic acid present for each part by weight of the partially saponified polymeric compound.

17. An improved grease composition comprising a major proportion of a lubricating oil, an organic acid sodium salt grease thickening agent in sufficient amount to thicken said oil to grease consistency, and a small amount, sufficient to improve the resistance of the grease to emulsification in water, of a polymeric compound containing recurring saponifiable groups selected from the class of carboxyl and carboxy-ester groups of which 10 to 60% are saponified by a metal selected from the group consisting of alkali metals and alkaline earth metals.

18. An improved grease composition consisting essentially of a major proportion of a mineral lubricating oil, a fatty acid sodium salt grease thickening agent in sufficient amount to thicken said oil to grease consistency, and a small amount, sufficient to improve the resistance of the grease to emulsification in water, of an alkyl methacrylate polymer having a molecular weight from about 10,000 to about 20,000, in which polymer about 20 to 40% of the saponifiable groups have been saponified with an alkali metal.

19. A grease composition consisting essentially of a lubricating oil, about 5% to 50% by weight of the finished composition of the sodium salt of an organic acid containing an alkyl group having from 10 to 30 carbon atoms, and about 0.05% to 7.5% by weight of the finished composition of a partially saponified polymeric compound containing recurring saponifiable groups, of which groups selected from the class consisting of carboxyl and carboxy-ester groups from 10% to 60% are saponified by a metal selected from the group of alkali metals and alkaline earth metals.

BRUCE W. HOTTEN.

REFERENCES CITED

The following references are of record in the file of this patent:

UNITED STATES PATENTS

| Number | Name | Date |
|---|---|---|
| 2,274,673 | Earle | Mar. 3, 1942 |
| 2,409,333 | Wright | Oct. 15, 1946 |
| 2,443,378 | Dittmar et al. | June 15, 1948 |
| 2,451,895 | White | Oct. 19, 1948 |
| 2,468,099 | Morway | Apr. 26, 1949 |